Jan. 22, 1957  H. W. GARBE  2,778,261
WORK HOLDING FIXTURE FOR A LATHE
Filed June 3, 1952  2 Sheets-Sheet 1
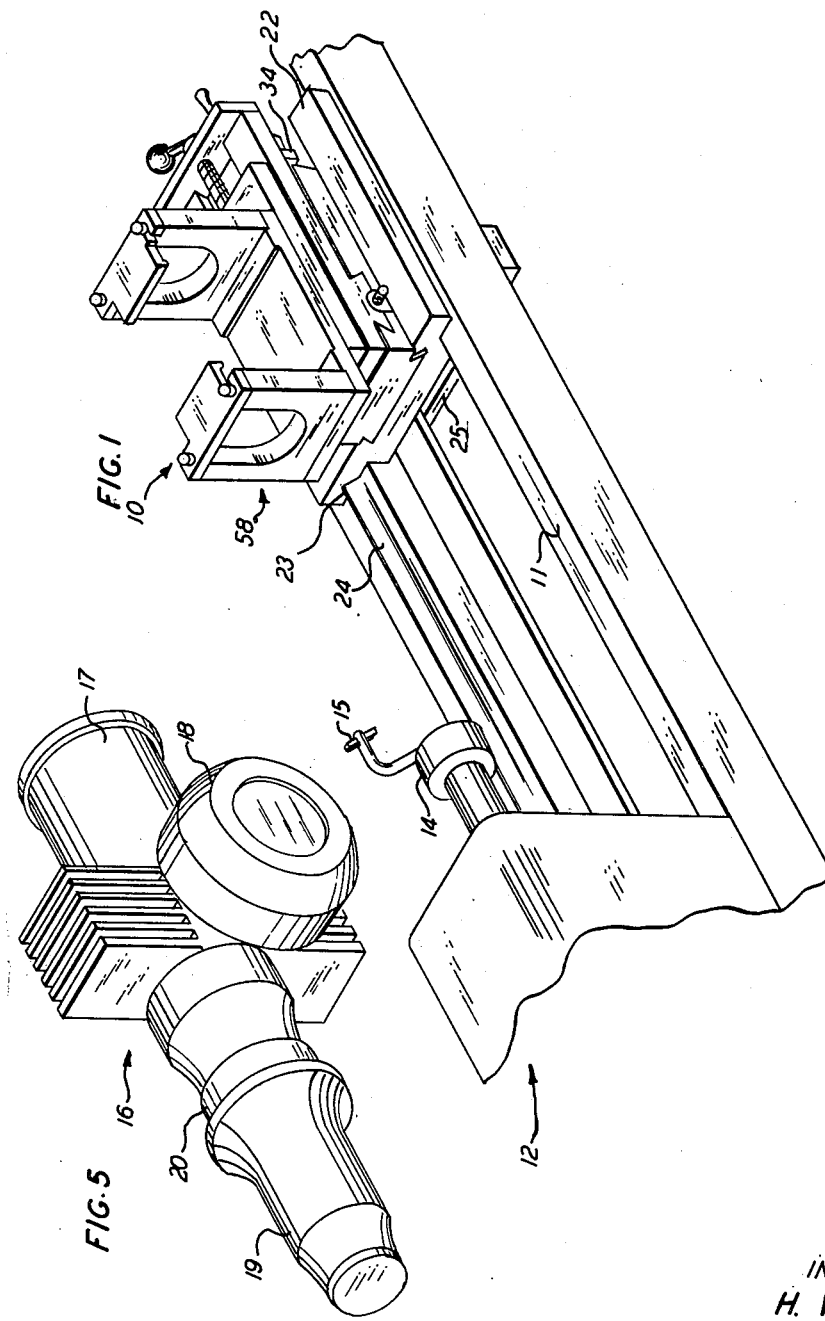
INVENTOR
H. W. GARBE
BY
W. C. Parnell
ATTORNEY Jan. 22, 1957 H. W. GARBE 2,778,261
WORK HOLDING FIXTURE FOR A LATHE
Filed June 3, 1952 2 Sheets-Sheet 2
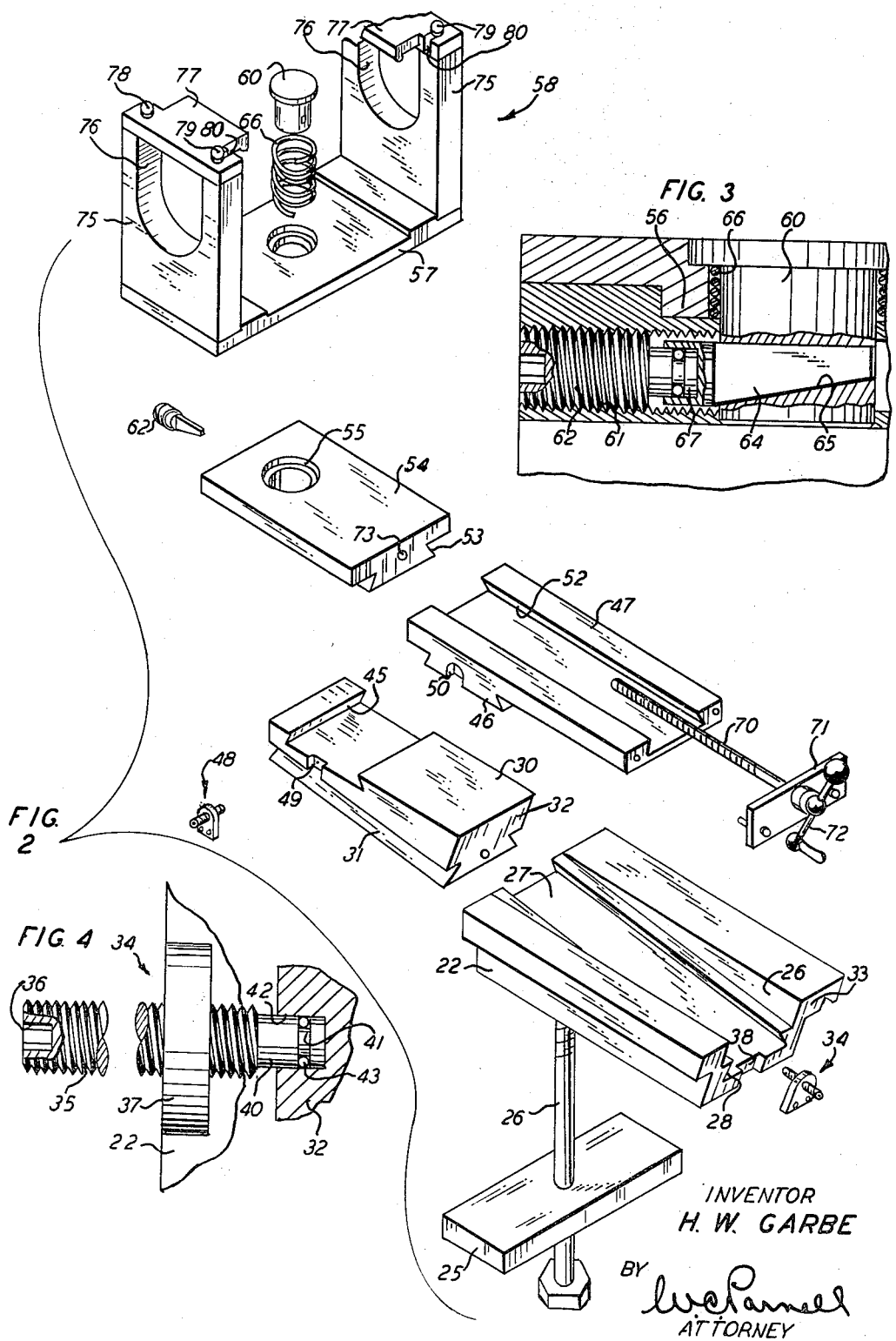
INVENTOR
H. W. GARBE
BY
ATTORNEY

United States Patent Office 2,778,261
Patented Jan. 22, 1957

2,778,261
WORK HOLDING FIXTURE FOR A LATHE

Howard W. Garbe, Allentown, Pa., assignor to Western Electric Company, Incorporated, New York, N. Y., a corporation of New York Application June 3, 1952, Serial No. 291,418

2 Claims. (Cl. 82—38)

This invention relates to working holding fixtures for lathes and more particularly to universally adjustable work holders.

During the initial manufacture of certain articles such as magnetrons, the various parts are formed individually and subsequently assembled. The completed article or magnetron is not only heavy but of an irregular contour making it impossible to mount in a head stock of a lathe for rotation relative to a fixed position tool. Due to the fact that magnetrons are costly to manufacture, it is important that damaged or otherwise defective tubes may be reconditioned by removing or correcting the damaged portions, truing up surfaces and performing other necessary operations thereon.

It is therefore the object of the invention to provide a work holding fixture which is sufficiently sturdy to hold an article relative to a rotatable tool and highly adjustable to present any desired portion of the article to the tool.

With this and other objects in view, the invention comprises a work holding fixture for a lathe having a bed and a rotatable tool supporting head stock. The fixture including a cradle adapted to receive and support the work, a base mounted at any selected position on the bed relative to the head stock and means interposed between the base and the cradle for adjustments of the cradle in a given plane and vertically relative to the head stock. The cradle, formed to firmly hold an article, is supported for rotatable adjustment about its axis to present any desired portion of the article to a tool supported by the head stock. A cam-like holding means is actuable to hold the cradle in any adjusted position about its axis. Furthermore, in addition to two sets of laterally adjustable elements, the supporting base has an inclined surface cooperating with an inclined surface of a companion member whereby the cradle with the article may be adjusted vertically.

Other objects and advantages will be apparent from the following detailed description when considered in conjunction with the accompanying drawings, wherein:

Fig. 1 is an isometric view of the work holding fixture shown mounted on a bed of a lathe.

Fig. 2 is an exploded isometric view of the fixture.

Fig. 3 is a fragmentary detailed sectional view of the cradle supporting and locking means.

Fig. 4 is a fragmentary sectional view of one of the adjusting means, and

Fig. 5 is an isometric view of one form of article to be supported by the fixture.

Referring now to the drawings, attention is first directed to Fig. 1 which illustrates the fixture indicated generally at 10, mounted on a bed 11 of a lathe 12 having a rotatable head stock 14 supporting any desired tool 15, depending upon the operation to be performed on an article supported by the fixture.

In the present embodiment of the invention, the fixture was designed particularly to receive the article shown in Fig. 5 which is a magnetron 16 having portions 17, 18, 19 and 20 which may be damaged and which may be reconditioned by the aid of the fixture 10. The parts 17, 18 and 19 are initially formed to receive other parts but if they should be damaged in any way wherein their contours have been varied, these irregularities may be corrected through the aid of the fixture and selected tools 15 mounted in the head stock. The same is true regarding the portion 20 which interengages the portion 19.

The fixture comprises a support 22 formed to nest in the bed 11 and grooved at 23 to receive a rail guide 24 of the bed. The support 22 may be clamped at any desired position on the bed through the aid of a cross-member 25 and a screw 26, shown in Fig. 2, threadedly receivable in an aperture of the support 22. The support 22 is longitudinally recessed at 26 including a tapered surface 27 at a dove-tailed portion 28 of the recess. A member 30 having a tapered dove-tailed portion 31 receivable in the dove-tailed portion 28 and positioned to ride on the surface 27, has a surface 32 disposed perpendicular to the bottom surface thereof and parallel with a tapered surface 33 of the support. Means is provided to adjust the member 30 relative to the support to produce an elevating means for the member and other portions of the fixture. This means is indicated generally at 34 in Fig. 2, and is shown in detail in Fig. 4. The adjusting means 34 includes a threaded member 35 adapted at 36 for rotation in a threaded aperture in a retaining member 37 mounted in a recess 38 of the support 22. The inner end of the member 35 is reduced in size as indicated at 40, provided with an annular groove 41 and rotatably positioned in an aperture 42 of the member 32. The portion 40 is free to rotate in the aperture 42 but connected to the member 30 by parallel pins 43 which extend through the groove 41 at diametrically opposed positions in the recess 41 so that longitudinal movement of the threaded member 35 in either direction will cause movement of the member 30 relative to the support.

The member 30 has a dove-tailed groove 45 disposed substantially at right angles to the dove-tailed portion 31 but parallel with the upper surface of the support 22 to receive a dove-tailed portion 46 of a member 47. An adjustable unit 48 identical in structure to the adjustable unit 34, shown in detail in Fig. 4, is mounted in a recess 49 of the member 30 and receivable in a recess 50 of the dove-tailed portion 46 where connection is provided by the adjustable means to cause movement of the member 47 laterally of the member 30.

The member 47 has a longitudinally extending dove-tailed groove 52 to receive a dove-tailed portion 53 of an element 54 which has a stepped aperture 55 to receive an integral annual portion 56 of a horizontal portion 57 of a cradle 58, as well as a spindle 60 rotatably connecting the cradle 58 to the element 54. The element 54 has a threaded aperture 61 to receive a threaded portion 62 of a locking means including a wedge-like element 64 receivable in an aperture 65 of a similar contour including an inclined lower surface. A spring 66, disposed concentric with the pin 60, normally urges the pin upwardly to free the cradle 58 for rotatable adjustment about its axis now the center line of the pin when the locking means 62—64 is released. The element 64 is substantially rectangular in cross-section and through the connection 67, the threaded member may be rotated in either direction to force the element 64 into clamping position or to release it to free the cradle for adjustment.

The element 54 is adjustably movable relative to the member 47 by the aid of a threaded shaft 70 rotatably carried by a plate 71 mounted on the adjacent end of the member 47 and having a hand crank 72 mounted on the outer end of the shaft to rotate it in a threaded aperture 73 of the element 54.

The cradle 58 includes vertical members 75 mounted adjacent the ends of the central member 57 and grooved at 76 to receive portions 17 and 20 of the article 16. Clamps 77 are mounted on the upper ends of the end member 75 through the aid of screws 78 and 79. The screws 79 being disposed in slots 80 whereby the clamps may be swung about the screws 78, when the screws 79 are loosened, sufficiently to free a reconditioned article from the cradle and condition the cradle to receive another article.

Considering now the operation of the fixture, let it be assumed that the article 16 is mounted therein in the general position shown in Figs. 1 and 5. The fixture in general may be adjusted relative to the tool 15 depending upon which part, 17, 18, 19 or 20, work is to be performed. After the fixture is located generally in the desired position through the aid of the screw 26, it is apparent that other adjustments may be made to position any one of the parts of the article accurately relative to the head stock 14. First, the adjusting means 62—64 shown in Fig. 3, may be loosened to free the cradle for rotation so that the desired part of the article may be disposed adjacent the head stock. After this has been accomplished, the article with the cradle may be adjusted toward or away from the head stock longitudinally of the bed by rotating the crank 72 and the adjusting screws 70. The article and cradle may be adjusted laterally in the same plane by actuating the adjusting means 48 in one direction or the other to align the part of the article as nearly as possible with the tool. Furthermore, the article may be raised or lowered with respect to the head stock by actuating the adjusting means 34. This adjusting means, however, is actuated in combination with the adjusting means 70—72 as in each instance longitudinal movement is imparted to the cradle relative to the bed and head stock. However, with this work holding fixture, a heavy article of a contour which is irregular, may be accurately located relative to the head stock of a lathe whereby selected tools singly supported by the head stock may machine, form or otherwise condition the parts of the articles.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A work holding fixture comprising a rotatably movable carriage adapted to receive and support work having an aperture therein with its centerline coincident with the axis of rotation of the carriage, a stationary base, members interposed between the carriage and the base and adapted for movement relative to each other and the base to cause movement of the carriage parallel with and perpendicular to the centerline, the uppermost member having companion apertures therein, the first disposed in alignment with the aperture of the carriage and the second disposed at an angle with respect to the first aperture, a spindle disposed in the aperture of the carriage and the first aperture of the uppermost member and having an outwardly projecting head to engage the carriage and an aperture, with a tapered surface, in alignment with the second aperture, a spring disposed concentric with the spindle between the uppermost member and the head to urge the head of the spindle free of the carriage to free the carriage for rotation, an element with a tapered surface disposed in engagement with the tapered surface of the aperture in the spindle to hold the spindle against rotation, and means disposed in the second aperture to move the element in one direction to free the spindle for movement by the spring and in another direction to cause the spindle to clamp the carriage against movement.

2. A work holding fixture comprising a rotatably movable carriage adapted to receive and support work having an aperture therein with its centerline coincident with the axis of rotation of the carriage, a stationary base, members interposed between the carriage and the base and adapted for movement relative to each other and the base to cause movement of the carriage parallel with and perpendicular to the centerline, the uppermost member having companion apertures therein, the first disposed in alignment with the aperture of the carriage and the second disposed at an angle with respect to the first aperture, a spindle disposed in the aperture of the carriage and the first aperture of the uppermost member and having an outwardly projecting head to engage the carriage and an aperture, with a tapered surface, in alignment with the second aperture, a spring disposed concentric with the spindle between the uppermost member and the head to urge the head of the spindle free of the carriage to free the carriage for rotation, an element with a tapered surface disposed in engagement with the tapered surface of the aperture in the spindle to hold the spindle against rotation, means disposed in the second aperture to move, the element in one direction to free the spindle for movement by the spring and in another direction to cause the spindle to clamp the carriage against movement, the stationary base and the lowermost member having interconnecting portions disposed at like angles relative to the centerline to cause the movement of the carriage parallel with the centerline during movement of the lowermost member relative to the base.

References Cited in the file of this patent
UNITED STATES PATENTS

| | | |
|---|---|---|
| 40,824 | Dean | Dec. 8, 1863 |
| 240,985 | Fellows | May 3, 1881 |
| 408,259 | Pentz | Aug. 6, 1889 |
| 467,341 | Cole | Jan. 19, 1892 |
| 516,586 | Branstetter | Mar. 13, 1894 |
| 734,427 | McCarter | July 21, 1903 |
| 900,457 | Whiting | Oct. 6, 1908 |
| 968,489 | Milne | Aug. 23, 1910 |
| 1,737,002 | De Vlieg | Nov. 26, 1929 |
| 1,881,147 | Thoma | Oct. 4, 1932 |
| 2,429,893 | Parks | Oct. 28, 1947 |
| 2,528,053 | Harris | Oct. 31, 1951 |
| 2,583,917 | Wiegant | Jan. 29, 1952 |